(12) United States Patent
Sheth et al.

(10) Patent No.: US 11,411,994 B2
(45) Date of Patent: Aug. 9, 2022

(54) DISCOVERING TRUSTWORTHY DEVICES USING ATTESTATION AND MUTUAL ATTESTATION

(71) Applicant: Cisco Technology, Inc., San José, CA (US)

(72) Inventors: Sujal Sheth, Gujarat (IN); Shwetha Subray Bhandari, Bangalore (IN); Eric Voit, Bethesda, MD (US); William F. Sulzen, Apex, NC (US); Frank Brockners, Cologne (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 25 days.

(21) Appl. No.: 16/839,576

(22) Filed: Apr. 3, 2020

(65) Prior Publication Data

US 2020/0322380 A1 Oct. 8, 2020

Related U.S. Application Data

(60) Provisional application No. 62/830,018, filed on Apr. 5, 2019, provisional application No. 62/829,998, filed on Apr. 5, 2019.

(51) Int. Cl.
*H04L 29/06* (2006.01)
*H04L 9/40* (2022.01)

(52) U.S. Cl.
CPC ........ *H04L 63/162* (2013.01); *H04L 63/0853* (2013.01); *H04L 63/126* (2013.01)

(58) Field of Classification Search
CPC . H04L 63/162; H04L 63/0853; H04L 63/126; H04L 63/0869; H04L 63/0876;
(Continued)

(56) References Cited

U.S. PATENT DOCUMENTS 7,810,138 B2 † 10/2010 Vank
7,926,100 B2 † 4/2011 Lee
(Continued)

OTHER PUBLICATIONS

Invitation to Pay Additional Fees, and Where Applicable, Protest Fee from the International Searching Authority, dated Jul. 2, 2020, 13 pages, for corresponding International Patent Application No. PCT/US2020/026742.
(Continued)

*Primary Examiner* — Quazi Farooqui
(74) *Attorney, Agent, or Firm* — Polsinelli PC

(57) ABSTRACT

Systems, methods, and computer-readable media for discovering trustworthy devices through attestation and authenticating devices through mutual attestation. A relying node in a network environment can receive attestation information from an attester node in the network environment as part of a unidirectional push of information from the attester node according to a unidirectional link layer communication scheme. A trustworthiness of the attester node can be verified by identifying a level of trust of the attester node from the attestation information. Further, network service access of the attester node through the relying node in the network environment can be controlled based on the level of trust of the attester node identified from the attestation information.

20 Claims, 11 Drawing Sheets

(58) Field of Classification Search
CPC ......... H04L 63/10; H04L 41/12; H04L 29/06; Y02D 30/00; G06F 21/53; G06F 21/445
See application file for complete search history.

(56) References Cited

U.S. PATENT DOCUMENTS

| | | | | |
|---|---|---|---|---|
| 2003/0023845 | A1* | 1/2003 | VanHeyningen | H04L 9/0643 713/151 |
| 2004/0158735 | A1† | 8/2004 | Roese | |
| 2014/0122873 | A1* | 5/2014 | Deutsch | H04L 63/0884 713/158 |
| 2014/0337277 | A1* | 11/2014 | Asenjo | G06Q 10/06 707/603 |
| 2018/0198620 | A1* | 7/2018 | Pearson | G09C 1/00 |
| 2019/0068466 | A1* | 2/2019 | Chagam Reddy | G06F 15/7867 |
| 2019/0349426 | A1* | 11/2019 | Smith | H04L 67/104 |
| 2020/0389469 | A1* | 12/2020 | Litichever | H04L 63/0236 |

OTHER PUBLICATIONS

International Search Report and Written Opinion from the International Searching Authority, dated Aug. 24, 2020, 19 pages, for corresponding International Patent Application No. PCT/US2020/026742.
"TCG Trusted Network Communications TNC Architecture for Interoperability," Specification Version 2.0, Oct. 16, 2017, 61 pages.
Zhang, Zijian, et al., "Computationally Sound Symbolic Analysis of EAP-TNC Protocol," Nov. 27, 2011, pp. 113-128.
Detken, Kai-Oliver, et al., "Integrity Protection in a Smart Grid Environment for Wireless Access of Smart Meters," $2^{nd}$ IEEE International Symposium on Wireless Systems with the Conference on Intelligent Data Acquisition and Advanced Computing Systems, Sep. 11-12, 2014, 8 pages.
Khosravi, Hormuzd, et al., "Requirements for Network Endpoint Access (NEA)," draft-khosravi-nea-requirements-00.txt., May 2006, 17 pages.
Göttert, Norman, et al., "Trusted Neighborhood Discovery in Critical Infrastructures," 2014 IEEE International Conference on Smart Grid Communications, 2014, pp. 976-981.
Zhang, Jun et al.; TRDP: a Trusted Router Discovery Protocol; IEEE; 2007.†
Schridde, Christian et al.; TrueIP; Prevention of IP Spoofing Attacks Using Identity-Based Cryptography; SIN; Oct. 2009.†
Moskowitz, Robert; AuthenticationTypes; ICSAlabs; Draft version1. 2; Jul. 16, 2003.†
Nayarasi; CWSP—4 Way Handshake; Aug. 19, 2014.†
Crash Course: 802.1X: The Great Authenticator: p. 2 of 7; Networkcomputing; Jun. 28, 2006.†
802.1x and EAP Authentication Protocols; Mar. 22, 2009.†
Hwang, Hyunuk; A Study on MITM (Man in the Middle) Vulnerability in Wireless Network Using 802.1X and EAP; Feb. 2008.†
Owens, Les et al.; Wireless Security Perspectives; Cellular Networking Perspectives; vol. 4, No. 1, Jan. 2002.†
Avaya; 802.1X Authentication, Link Lover Discovery Protocol (LLDP) and Avaya IP Telephones; Avaya Inc; Revised Apr. 14, 2009.†
Wong, Jenne; Performance Investigation of Secure 802.11 Wireless LANS; Raising the Security Bar to Which Level?; Thesis; University of Canterbury; 2003.†
Lu, Yiqin et aol.; An SDN-Based Authentication Mechanism for Securing Neighbor Discovery Protocol in IPv6; Hindawi; Security and Communication Networks; vol. 2017, Article ID 5838657; Jan. 17, 2017.†

* cited by examiner
† cited by third party

DISCOVERING TRUSTWORTHY DEVICES USING ATTESTATION AND MUTUAL ATTESTATION

CROSS-REFERENCE TO RELATED APPLICATIONS

This application claims priority to both U.S. Provisional Patent Application No. 62/830,018, filed on Apr. 5, 2019, entitled "Discovering Trustworthy Devices Using Attestation" and U.S. Provisional Patent Application No. 62/829,998, filed on Apr. 5, 2019, entitled "Improving Security of Authentication Using Mutual Attestation," the contents of which are both incorporated herein by reference in their entirety.

TECHNICAL FIELD

The present disclosure generally relates to the field of computer networking, and more particularly to discovering trustworthy devices through attestation and authenticating devices through mutual attestation.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements/evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Many unidirectional device discovery/advertising protocols have been developed for managing device connections and network service access in network environments. For example, Link Layer Discovery Protocol (LLDP) and Cisco® Discovery Protocol (CDP) are link layer protocols for directly connected LLDP and CDP-capable neighbors to advertise themselves and their capabilities to each other. By default, a network device can send an LLDP or CDP advertisement periodically to all its interfaces and terminate and process incoming LLDP and CDP packets as required by the protocols. While unidirectional device discovery protocols, such as CDP and LLDP, can carry certain information, such as a chassis identifier or a system name, unidirectional device discovery protocols do not currently offer any way to determine whether a discovered device is trustworthy.

Additionally, many authentication protocols, and in particular unidirectional authentication protocols, such as Extensible Authentication Protocol (EAP), WiFi Protected Access (WPA), and IEEE 802.1x, can enable a cent (referred to as a supplicant in EAP/802.1x) to access a network using a secure handshake, based on a password and Public Key Infrastructure (PM), with a server (referred to as an authenticator in EAP/802.1x). However, these authentication protocols may no longer be sufficient to ensure the security of the client, server, or network in view of the new and evolving threats that network environments face today.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
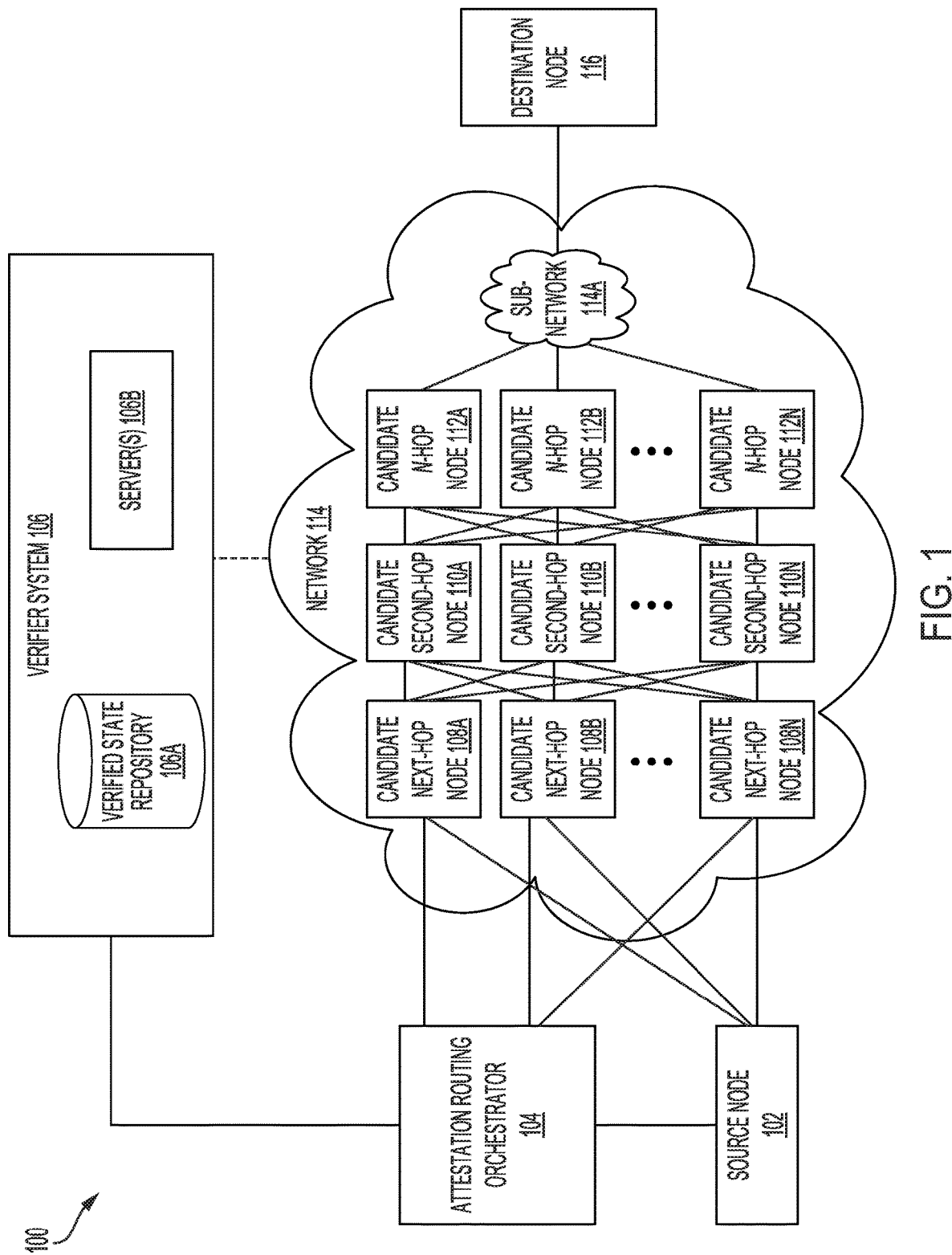
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for discovering trustworthy devices through attestation and authenticating devices through mutual attestation.

A method can include receiving, by a relying node in a network environment, attestation information from an attester node in the network environment as part of a unidirectional push of information from the attester node according to a unidirectional link layer communication scheme. The method can also include verifying a trustworthiness of the attester node by identifying a level of trust of the attester node from the attestation information. Further, the method can include controlling network service access of the attester node through the relying node in the network environment based on the level of trust of the attester node identified from the attestation information.

A system can include one or more processors and at least one computer-readable storage medium storing instructions which, when executed by the one or more processors, cause the one or more processors to receive, by a relying node in a network environment, attestation information from an attester node in the network environment as part of a unidirectional push of information from the attester node according to a unidirectional link layer communication scheme. The unidirectional link layer communication scheme can implement either 802.1x unidirectional discovery and authentication or one or more link layer unidirectional discovery protocols. The instructions can also cause the one or more processors to verify a trustworthiness of the attester node by identifying a level of trust of the attester node from the attestation information. Further, the instructions can cause the one or more processors to control network service access of the attester node through the relying node in the network environment based on the level of trust of the attester node identified from the attestation information.

A non-transitory computer-readable storage medium having stored therein instructions which, when executed by one or more processors, cause the one or more processors to receive, by a relying node in a network environment, attestation information from an attester node in the network environment as part of a unidirectional push of information from the attester node according to a unidirectional link layer communication scheme. The unidirectional link layer communication scheme can implement either or both unidirectional device discovery and unidirectional authentication. The instructions can also cause the one or more processors to verify a trustworthiness of the attester node by identifying a level of trust of the attester node from the attestation information. Further, the instructions can cause the one or more processors to control network service access of the attester node through the relying node in the network environment based on the level of trust of the attester node identified from the attestation information.

The foregoing, together with other features and embodiments, will become more apparent upon referring to the following specification, claims, and accompanying drawings.

Example Embodiments

The disclosed technology addresses the need in the art for discovering trustworthy devices through attestation and authenticating devices through mutual attestation. The present technology involves system, methods, and computer-readable media for verifying the trustworthiness of devices through a unidirectional neighbor discovery protocol using attestation. Further, the present technology involves systems, methods, and computer-readable media for verifying the trustworthiness of devices through a unidirectional authentication protocol using attestation.

Figure 8:
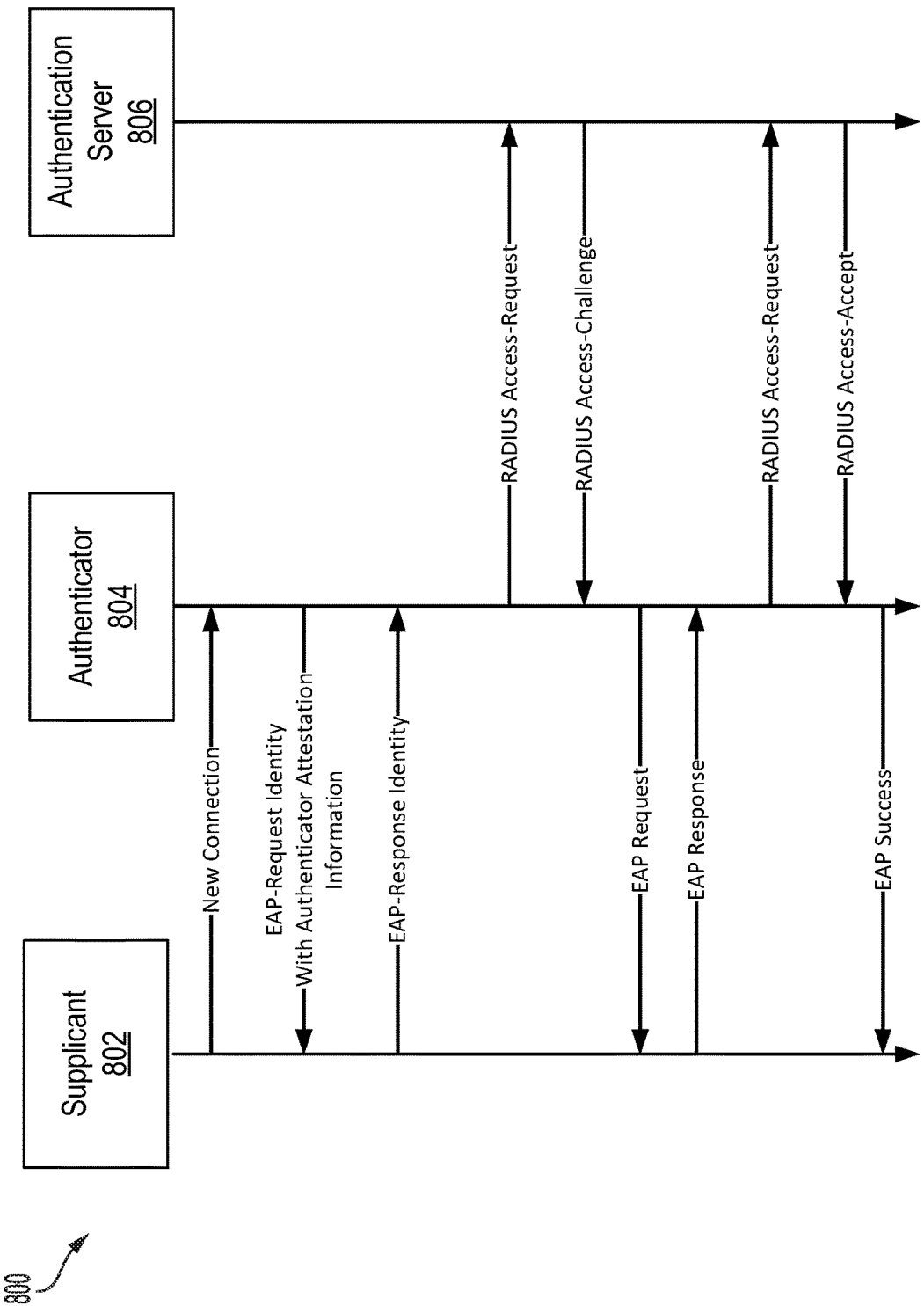
FIG. 8, shows a network timing diagram for verifying trustworthiness of an authenticator using attestation information transmitted from the authenticator to a supplicant according to a unidirectional link layer communication scheme implementing 802.1x for authenticating the supplicant.
Figure 9:
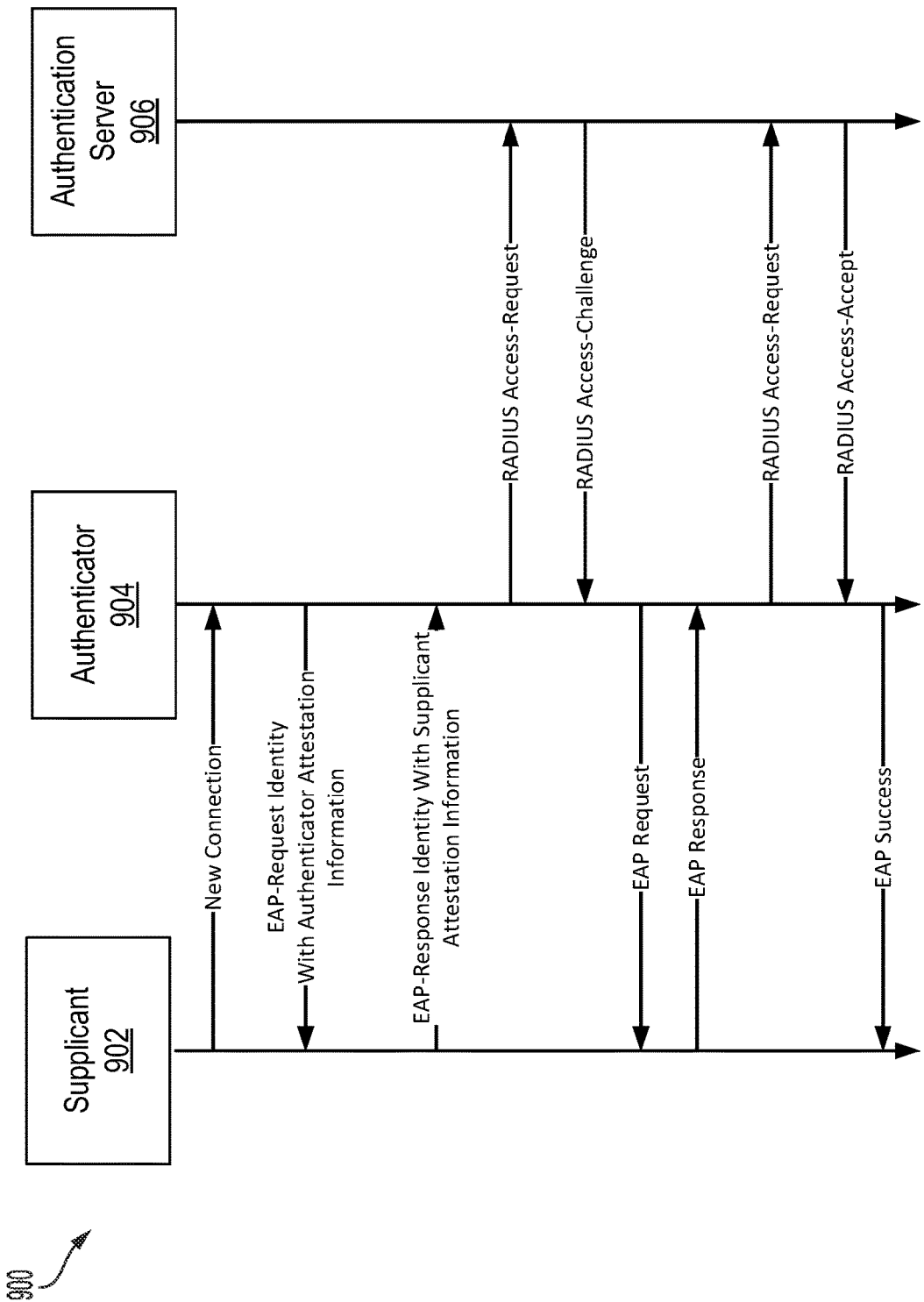
FIG. 9, shows a network timing diagram for mutually verifying the trustworthiness of a supplicant and an authenticator using attestation information transmitted according to a unidirectional link layer communication scheme implementing 802.1x for authenticating the supplicant.
Figure 10:
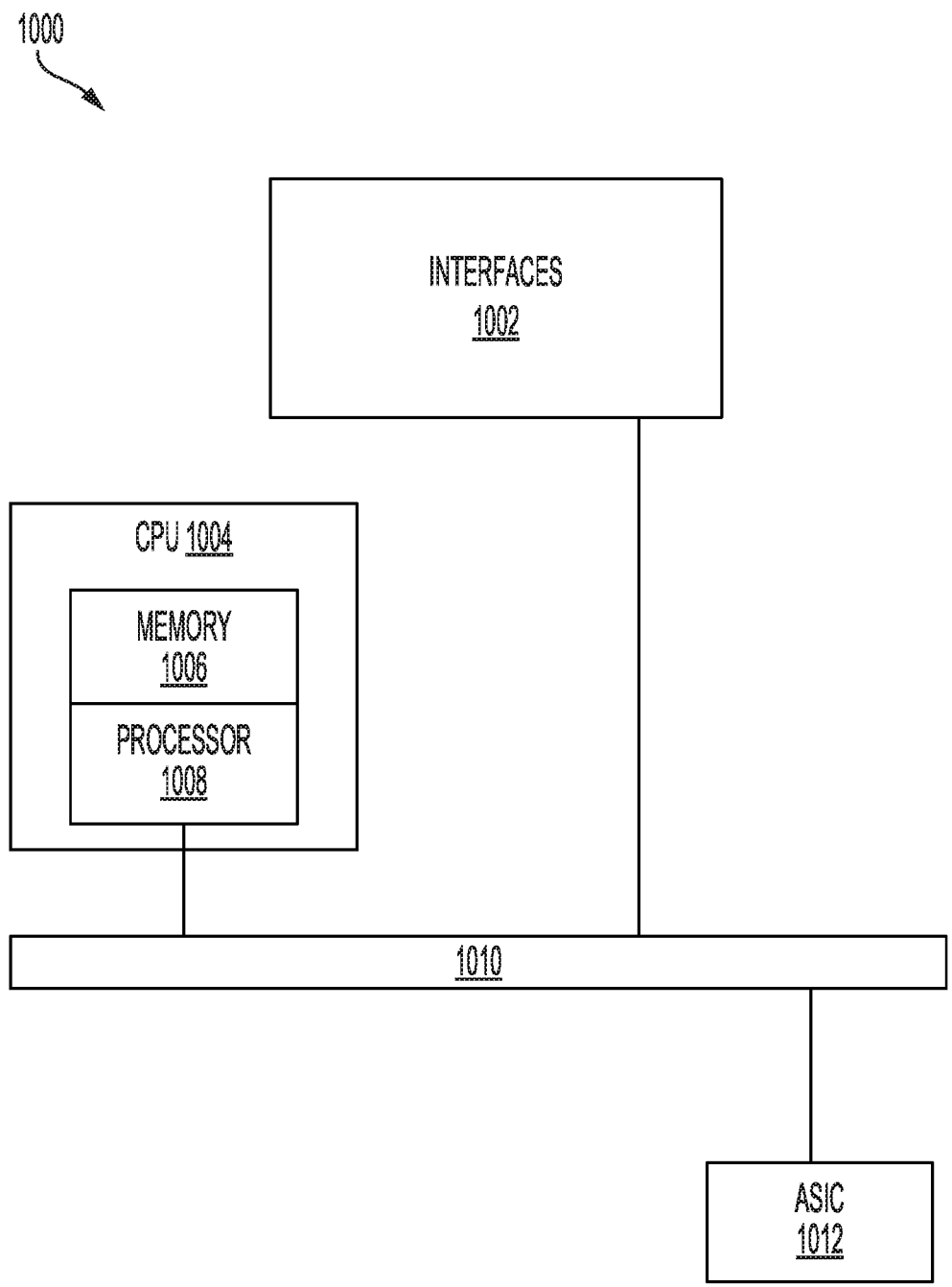
FIG. 10 illustrates an example network device in accordance with some examples.
Figure 11:
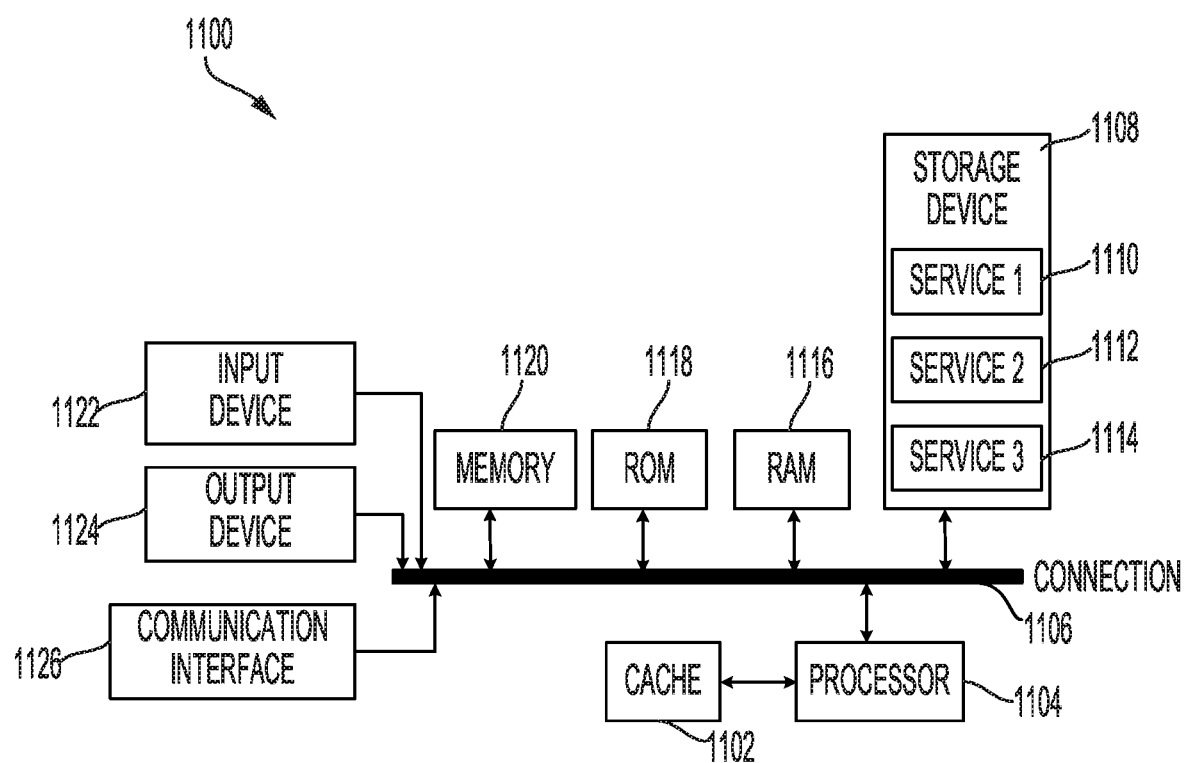
FIG. 11 illustrates an example computing device architecture in accordance with some examples.

The present technologies will be described in more detail in the following disclosure as follows. The disclosure begins with an initial discussion of systems and technologies for providing explicit verifiable proof of integrity of network nodes traversed by packets. A description of example systems, methods, and environments for providing verifiable proof of integrity of network nodes, as illustrated in FIGS. 1 through 4, will then follow. The discussion will then continue with a description of example systems, methods, and computer-readable media for discovering trustworthy devices through attestation and authenticating devices through mutual attestation, as shown in FIGS. 5 through 9. The discussion concludes with a description of an example network device and an example computing device architecture, as illustrated in FIGS. 10 and 11, including example hardware components suitable for performing various networking and computing operations described herein.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee or attester with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee or attester TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value II hash(canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attester, e.g. a node or a verifier, can use random numbers, otherwise pseudo-random numbers, created by peers and/or the attester to generate and verify attestation information. Specifically, the attester can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attester, can use the result created by the cryptoprocessor, to verify/validate that their corresponding provided random number was used in generating the nonce ultimately used by the cryptoprocessor to create the result. In turn, the layer 2 peers, potentially including the attester, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
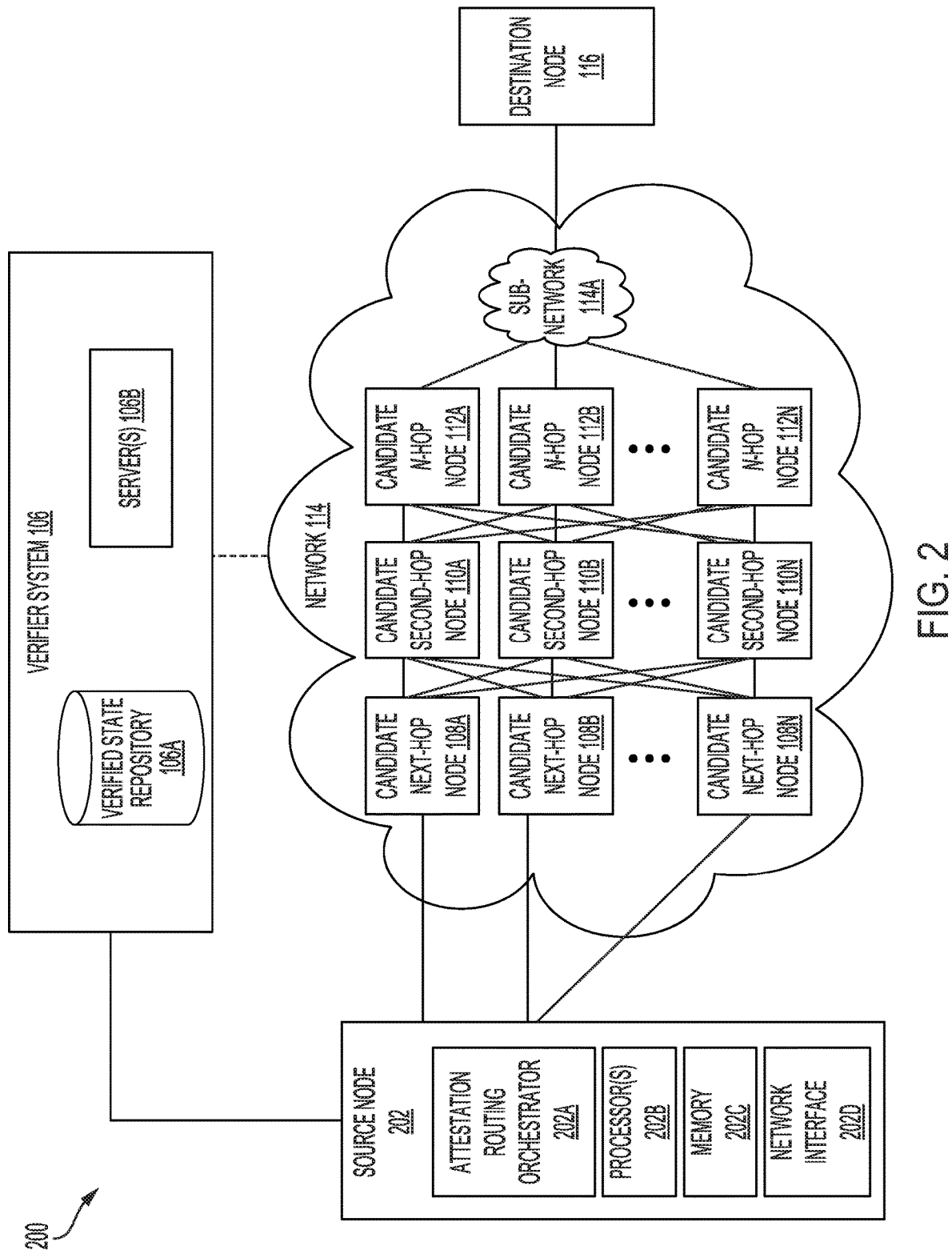

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
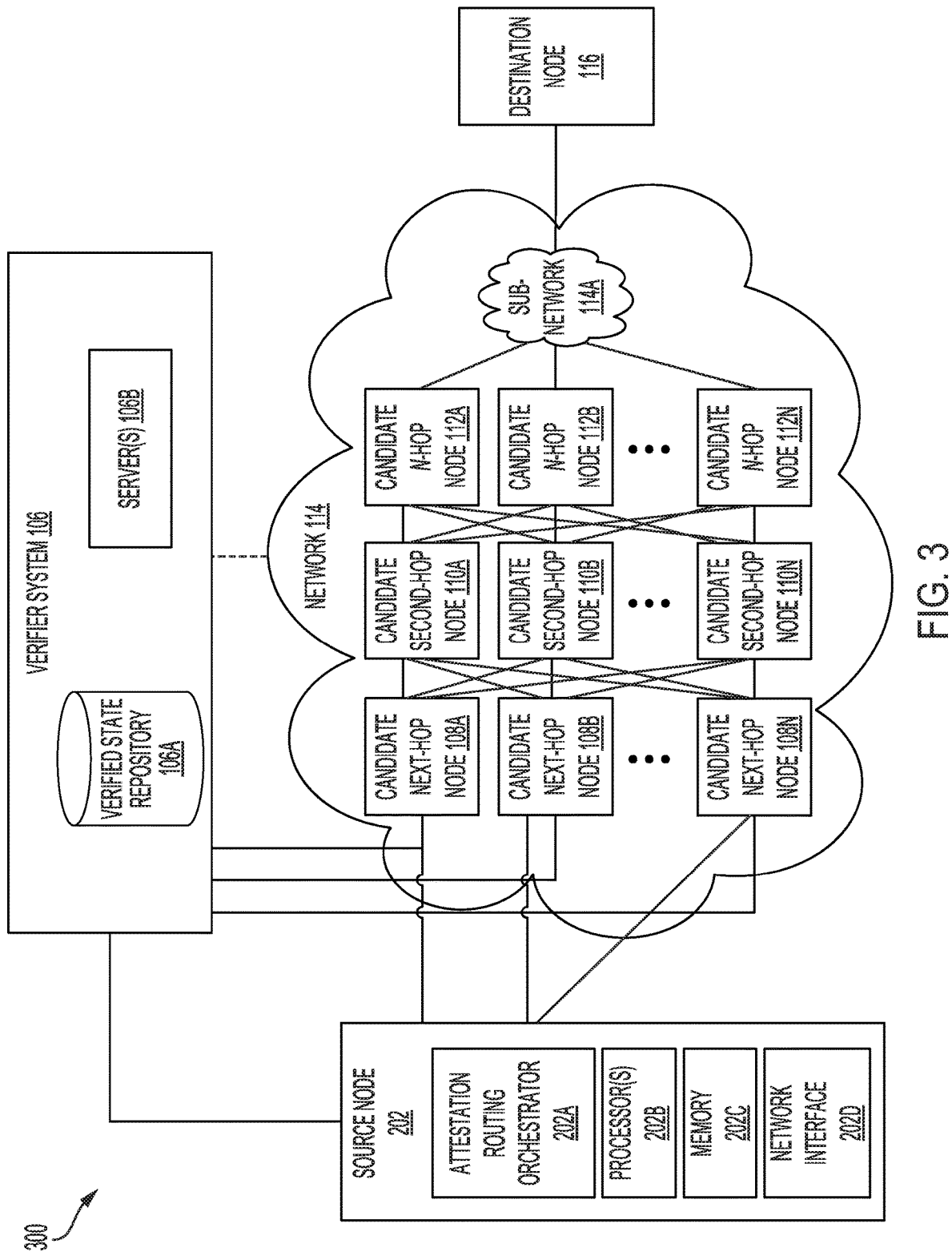

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
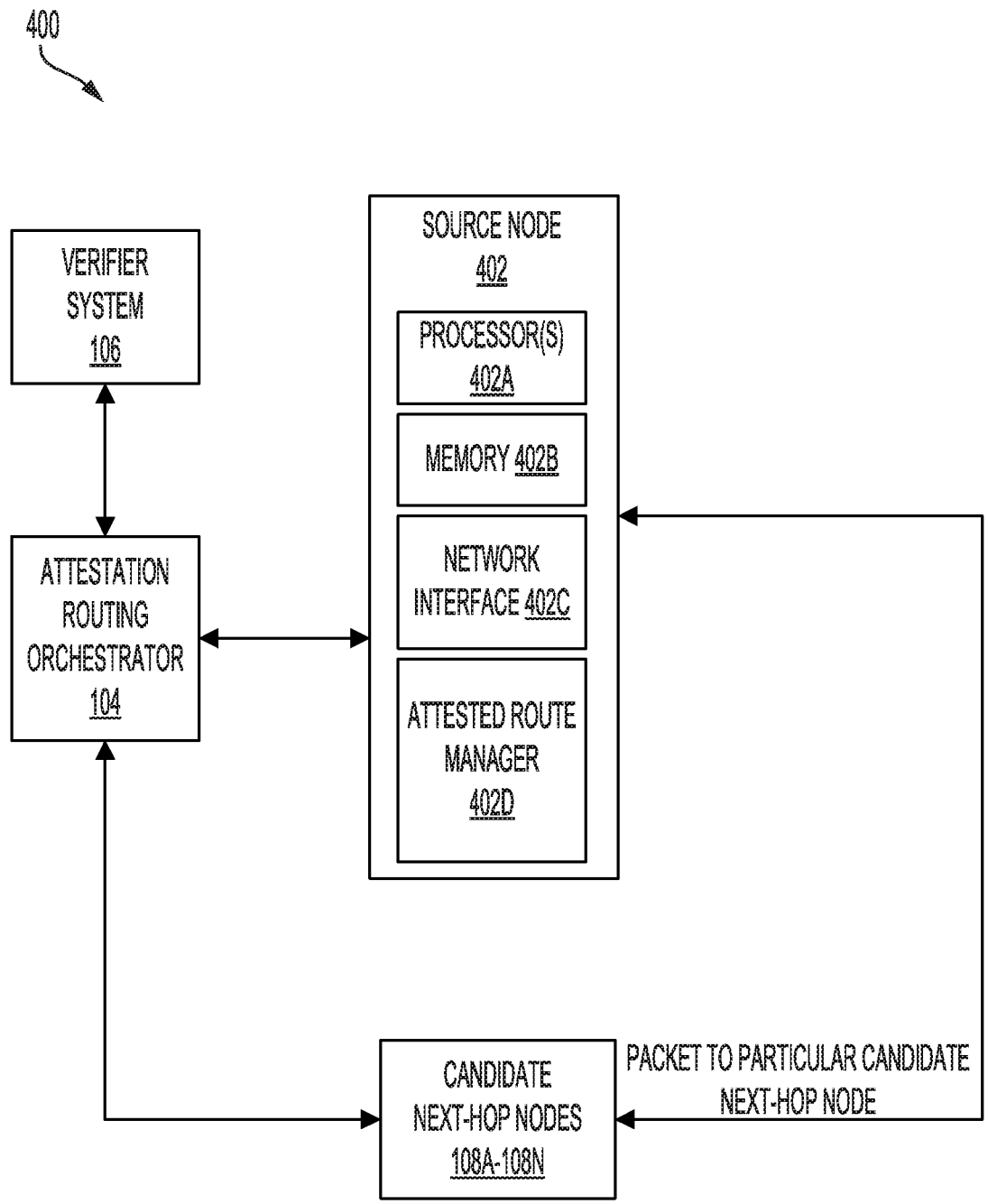
FIG. 4 illustrates an example of controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manager 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromised can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures ($P\_v$):

$$P\_v = 1 - ((1 - P\_v_1)(1 - P\_v_2)(1 - P\_v_x)) \quad \text{Equation (1).}$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1 - P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = 1 - ((1 - \text{chance of invisible compromise in time period } t)^{\wedge} \text{ number of } t \text{ intervals since a last verification of a good/uncompromised system state}) \quad \text{Equation (2).}$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c = 1 - ((1 - P_v) * (1 - P_i)) \quad \text{Equation (3).}$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

As discussed previously, many unidirectional device discovery/advertising protocols have been developed for managing device connections and network service access in network environments. For example, LLDP and CDP are link layer protocols for directly connected LLDP and CDP-capable neighbors to advertise themselves and their capabilities to each other. By default, a network device can send an LLDP or CDP advertisement periodically to all its interfaces and terminate and process incoming LLDP and CDP packets as required by the protocols. While unidirectional device discovery protocols, such as CDP and LLDP, can carry certain information, such as a chassis identifier or a system name, unidirectional device discovery protocols do not currently offer any way to determine whether a discovered device is trustworthy.

Additionally, many authentication protocols, and in particular unidirectional authentication protocols, such as EAP, WAP, or IEEE 802.1x, can enable a cent (referred to as a supplicant in EAP/802.1x) to access a network using a secure handshake, based on a password and PM, with a server (referred to as an authenticator in EAP/802.1x). However, these authentication protocols may no longer be sufficient to ensure the security of the client, server, or network in view of the new and evolving threats that network environments face today.

The present includes systems, methods, and computer-readable media for solving these problems/discrepancies. Specifically, the present technology involves system, methods, and computer-readable media for discovering trustworthy devices through attestation and authenticating devices through mutual attestation. In particular, the present technology involves system, methods, and computer-readable media for verifying the trustworthiness of devices through a unidirectional neighbor discovery protocol using attestation. Further, the present technology involves systems, methods, and computer-readable media for verifying the trustworthiness of devices through a unidirectional authentication protocol using attestation.

Figure 5A:
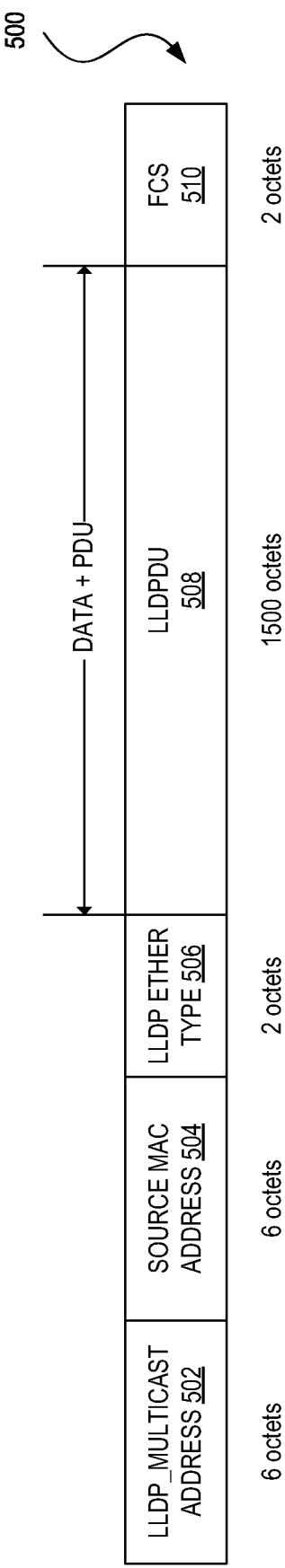
FIG. 5A shows an example of a format for an LLDP frame.
Figure 5B:
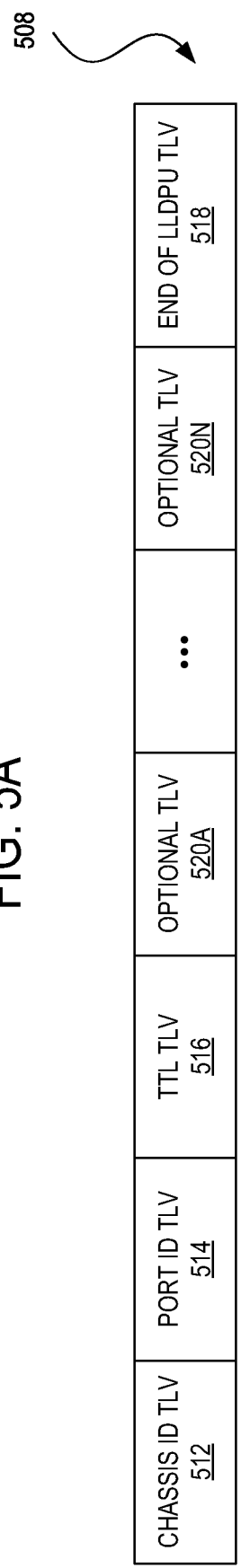
FIG. 5B shows an example of a format for the payload or an LLDP Data Unit (LLDPDU)
Figure 5C:
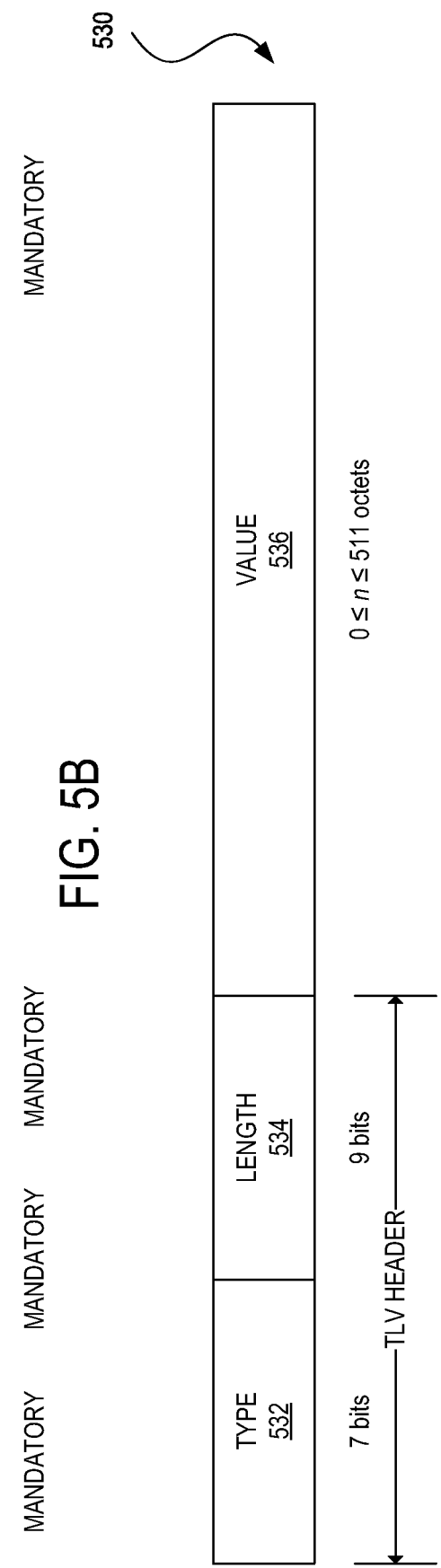
FIG. 5C illustrates an example of a format for a basic type-length-value (TLV) record.

FIGS. 5A-5C show block diagrams of examples of formats for a frame, a Protocol Data Unit (PDU), and a basic Type Length Value (TLV) record for a network discovery protocol. One of ordinary skill in the art will understand that, for the protocol formats and any protocol discussed in the present disclosure, there can be additional or fewer fields in similar or alternative sequences. Although Link Layer Discovery Protocol (LLDP) is shown as the network discovery protocol in this example, other embodiments may utilize other discovery protocols, such as Cisco® Discovery Protocol (CDP), Neighbor Discovery Protocol (NDP), and the like. In addition, other embodiments may include different numbers or types of fields, sizes of fields, or mandatory fields but one of ordinary skill the art will appreciate that such variations do not depart from the scope of the present disclosure.

FIG. 5A shows an example of a format for an LLDP frame 500. The LLDP frame 500 can include a destination address 502, a source address 504, an ether type 506, a payload 508, and a frame check sequence (FCS) 510. The destination address 502 may identify a multicast address designated for LLDP. The source address 504 may identify the network device 102 originating the LLDP frame 500. The ether type 506 may identify the protocol encapsulated in the payload 508. In some embodiments, the ether type 506 may also identify the size of the payload 508 and/or the LLDP frame 500. The payload 508 can include LLDP data and padding and is discussed in further detail with respect to FIG. 5B. The FCS 510 may identify an error-detecting code, if any, associated with the LLDP frame 500.

FIG. 5B shows an example of a format for the payload 508 or an LLDP Data Unit (LLDPDU). The payload 508 can include a set of formatted records or type-length-values (TLVs) for providing and error and other diagnostic information regarding the network device 102. In this example, the payload 508 comprises a set of mandatory TLVs, including a chassis identifier TLV 512, a port identifier TLV 514, a time-to-live (TTL) TLV 516, and an end of LLDPDU TLV 518. The chassis identifier TLV 512 can include a globally unique identifier for identifying the network device 102. The port identifier TLV 514 can identify the port from which the network device 102 sends LLDP messages to a particular neighboring device. The TTL TLV 516 can provide LLDP message aging information. The end of LLDPDU TLV 518 can mark the end of LLDP processing. The payload 508 can also include a set of optional TLVs 520A . . . 520N (collectively, 520), that can provide diagnostic information such as the system name, system description, management address, and so forth. Table 1 sets forth examples of LLDP TLVs.

TABLE 1

Examples of LLDP TLVs

| TLV Type | TLV Name | Description | Usage in LLDPDU |
|---|---|---|---|
| 0 | End of LLDPDU | A TLV marking the end of LLDP TLVs in the LLDPDU | Mandatory |
| 1 | Chassis Identifier | An administratively assigned name that identifies a particular chassis within the context of an administrative domain that comprises one or more networks | Mandatory |
| 2 | Port Identifier | An administratively assigned name that identifies a particular port within the context of a system, where the identification is convenient, local to the system, and persistent for the system's use and management | Mandatory |
| 3 | Time-to-live | Indicates the number of seconds that an LLDP recipient is to regard the information in an LLDP message to be valid; when the value is non-zero, the LLDP recipient is notified to completely replace all information associated with the LLDP sender with the information in the received LLDPDU; when the value is zero, the LLDP recipient is notified all system information associated with the LLDP sender is to be deleted | Mandatory |
| 4 | Port Description | An administratively assigned description of the port | Optional |
| 5 | System Name | An administratively assigned name of the system | Optional |
| 6 | System Description | An aministratively assigned description of the system | Optional |

TABLE 1-continued

Examples of LLDP TLVs

| TLV Type | TLV Name | Description | Usage in LLDPDU |
|---|---|---|---|
| 7 | System Capabilities | Identifies the primary function(s) of the system and whether or not these primary functions are enabled | Optional |
| 8 | Management Address | Identifies an address associated with the local LLDP agent that may be used to reach higher layer entities to assist exchange of error information | Optional |
| 9 | Hardware Fingerprint | A unique identifier for the network device, such as a Secure Unique Device Identifier (SUDI). In other embodiments, the hardware fingerprint may comprise a Unique Device Identifier, a MAC address, or other unique identifier. | Optional |
| 10 | Metadata Element (e.g. Canary stamp) | A metadata element (e.g. token or counter value) from a device's Trusted Platform Module (TPM). | Optional |
| 11-126 | Reserved | | Optional |
| 127 | Custom TLVs | TLVs for extending LLDP | Optional |

FIG. 5C illustrates an example of a format for a basic type-length-value (TLV) record 530. The TLV 530 can include a type field 532, a length field 534, and a value field 536. As discussed, Table 1 sets forth examples of different types and values of TLVs that may be used in LLDP. The length field 534 can identify the length of the value field 536 in octets. In this example, the length field 534 is 9 bits in length, and thus, the value field 536 can be between 0 and 511 octets.

Figure 6:
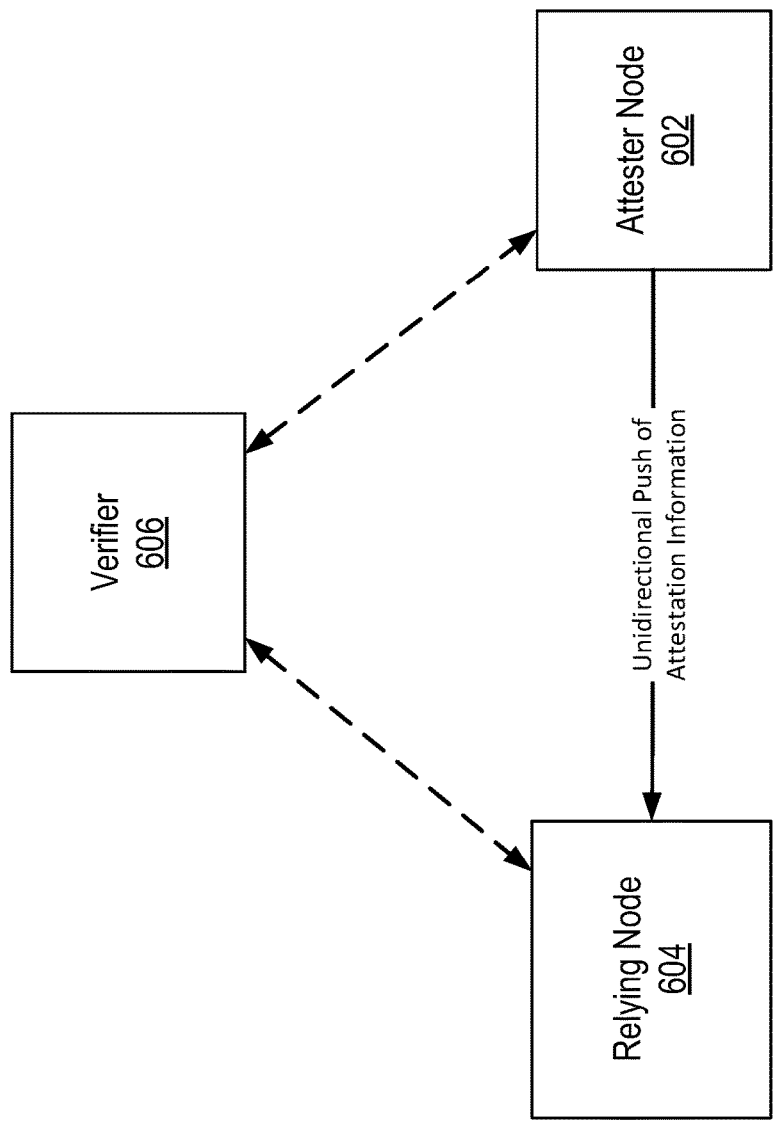
FIG. 6 illustrates an example network environment for discovering trustworthy devices through attestation and authenticating devices through mutual attestation.

FIG. 6 illustrates an example network environment 600 for discovering trustworthy devices through attestation and authenticating devices through mutual attestation. The example environment 600 includes an attester node 602 and a relying node 604. Both the attester node 602 and the relying node 604 can be applicable nodes/devices for communicating in the network environment 600. Specifically, both the attester node 602 and the relying node 604 can exchange communications with each other through the network environment 600 as part of the attester node 602 accessing or attempting to access network services through the network environment 600, e.g. through the relying node 604.

In the example network environment 600, the attester node 602 is a node that is configured to provide attestation information for verifying the trustworthiness of the attester node 602. In turn, the relying node 604 is a node that can verify the trustworthiness of the attester node 602 based on the attestation information. As used herein, verifying trustworthiness of a node includes verifying the trustworthiness/integrity of applicable aspects, e.g. operational aspects, of the node. For example, and as will be discussed in greater detail later, verifying trustworthiness of a node can include verifying the integrity of either or both hardware and software associated with the node. Verifying trustworthiness of a node can include determining one or more trust/integrity levels or extents of the node. In turn, the trustworthiness/integrity of the node can be quantified or qualified with respect to the identified trust/integrity levels or extents. For example, trustworthiness of a node can be quantified or qualified by comparing an identified trust level of the node with threshold trust levels for nodes in a network environment. Further in the example, if a node has a trustworthy level that falls below a threshold trust level for nodes in a network environment, then the node can be identified as untrustworthy.

If the attester node 602 is verified as trustworthy based on attestation information, then the attester node 602 can access services in the network environment 600 based on the verified trustworthiness of the attester node 602. Specifically, if the attester node 602 is verified as trustworthy using attestation information transmitted through either or both neighbor discovery and authentication, then the attester node 602 can access services in the network environment 600. More specifically, the attester node 602 can access network services through the relying node 604 if the attester node 602 is verified as trustworthy based on attestation information. For example, if the relying node 604 verifies that the attester node 602 is trustworthy using attestation information transmitted through either or both neighbor discovery and authentication, then the relying node 604 can establish a connection with the attester node 602. In turn, the attester node 602 can access network services through the connection established with the attester node 602. Alternatively, if the relying node 604 verifies that the attester node 602 is untrustworthy using attestation information transmitted through either or both neighbor discovery and authentication, then the relying node 604 can refrain from establishing or maintaining a connection with the attester node 602.

The network environment 600 also includes a verifier 606. The verifier 606 can communicate with either or both the attester node 602 and the relying node 604, as will be discussed in greater detail later, for facilitating verification of the trustworthiness of the attester node 602. The verifier 606 functions according to an applicable system for verifying the trustworthiness of a node in a network environment, such as the verifier system 106 discussed with respect to FIGS. 1-4. For example, the verifier 606 can verify that attestation information received by the relying node 604 from the attester node 602 is valid. In turn, the relying node 604 can verify that the attester node 602 is either untrustworthy or trustworthy based on whether the attestation information received by the relying node 604 is verified. In another example, the verifier 606 can verify measurements made by the attester node 602. In turn, the verified measurements can be used to form attestation information that is ultimately transmitted to the relying node 604 for verifying the trustworthiness of the attester node 602.

In the example network environment 600 shown in FIG. 6, the attester node 602 functions to send attestation information to either or both the relying node 604 and the verifier 606. The attestation information can be generated using an applicable technique for generating data used in verifying the trustworthiness of a device/node, e.g. using the previously described attestation techniques. For example, the attestation information can be generated using a TPM and/or stamps, e.g. Canary stamps.

Attestation information, as used herein, includes applicable data for verifying the trustworthiness of a device/node. Specifically, attestation information can include the previously described information used in verifying integrity of a node in a network environment. For example, attestation information can include PCR values for verifying integrity of a node in a network environment. The attestation information can include information for verifying trustworthiness of software executed at the attester node 602. For example, the attestation information can include an indicator/metadata elements for measurements of software executing at the attester node 602. Further, the attestation information can include information for verifying the trustworthiness of hardware of the attester node 602. For example, the attestation information can include an indicator/metadata elements for measurements of hardware elements at the attester node 602.

The attestation information sent from the attester node 602 to the verifier 606 can include information/evidence that is used to validate/corroborate specific measurements of the attester node 602. Specifically, the attestation information can include evidence that is used to validate measurements of the attester node 602 which can then be used to verify the trustworthiness of the attester node 602. More specifically, the evidence can be used to validate the measurements which are ultimately used in verifying the trustworthiness of the attester node 602 at the relying node 604, e.g. through attestation information that is sent from the attester node 602 to the relying node 604. The attestation information can include log information of the attester node 602 that can be used to validate measurements of the attester node 602. Log information of the attester node 602 can include applicable log information gathered for a node/device in a network environment, such as the information in the previously described logs. Specifically, the log information can describe one or more states at the attester node 602 and be used in verifying one or more measurements received from the attester node 602, e.g. as part of the attestation information. More specifically, the log information can be used to verify, not verify, or partially verify measurements at the attester node 602. For example, the log information can include hardware measurements of a specific state of the attester node 602 that can be used to verify PCR values received from the attester node 602. Further in the example, the log information can be used to verify that a chip state at the attester node 602 matches the log information.

The attester node 602 can send attestation information to the relying node 604 as part of a unidirectional push of information. Specifically, the attester node 602 can send attestation information to the relying node 604 as part of a unidirectional push of information according to a unidirectional link layer communication scheme. A unidirectional link layer communication scheme can include an applicable communication scheme through which either or both unidirectional device, e.g. neighbor device, discovery and unidirectional device authentication is performed in a network environment. Specifically, a unidirectional link layer communication scheme can implement the IEEE 802.1x (802.1x) protocol or WAP for performing unidirectional device discovery and authentication. For example, a unidirectional link layer communication scheme can implement the encapsulation of Extensible Authentication Protocol (EAP) over 802.1X in performing unidirectional device authentication. Further, a unidirectional link layer communication scheme can implement one or more applicable link layer unidirectional device discovery protocols. For example, a unidirectional link layer communication scheme can implement at least one of LLDP, CDP, Foundry Discovery Protocol (FDP), Nortel Discovery Protocol (NDP), and Link Layer Topology Discovery (LLTD).

EAP is an authentication framework that defines the transport and usage of identity credentials. EAP can encapsulate information, such as the usernames, passwords, certificates, tokens, one-time password (OTPs), and so on, that a client is sending for purposes of authentication. EAP is used for authentication in many types of networks, such as Virtual Private Networks (VPNs), Local Area Networks (LANs), and Metropolitan Area Networks (MANs), among others.

EAP over LAN (EAPoL) or IEEE 802.1x (also sometimes referred to as 802.1x or Dot1x) is a standard for port-based network access control for LANs, MANs, and the like. EAPoL or 802.1x can include three main components, a supplicant, authenticator, and authentication server. The supplicant can be software on the endpoint (sometimes also referred to as a client or a peer) that transmits and receives EAP messages over Layer 2. The supplicant can communicate with the authenticator and provide identity credentials in EAP messages. The authenticator can be a network device that controls access to the network based on the authentication status of the endpoint (i.e., an access network device, such as a switch, a Wireless LAN (WLAN) controller, security devices). The authenticator can receive Layer 2 communications from the supplicant, encapsulate it in Remote Authentication Dial-In User Service (RADIUS), and transmit the encapsulated communications to an active authentication server.

The authentication server (sometimes referred to an Authentication, Authorization, and Accounting (AAA) server) can perform the actual authentication of clients. The authentication server can validate the identity of the endpoint and provide the authenticator with a result, such as to allow or deny access. In some embodiments, the Cisco® Identity Services Engine (ISE) can be deployed as the authentication server.

In some embodiments, the authenticator can operate as a middleman or proxy. For example, the actual EAP identity exchange and authentication can occur between the supplicant and the authentication server. The authenticator may have no idea which EAP type is in use or whether the client's credentials are valid. The authenticator may simply take the unmodified EAP frame and encapsulate it within a RADIUS packet sent to the authentication server and authorize access to a requested port at the direction of the authentication server. EAP authentication itself can therefore be completely transparent to the authenticator.

The authentication can be initiated by either the authenticator or the supplicant. The authenticator can initiate authentication when the link state changes from down to up or periodically as long as the port remains up and unauthenticated. The authenticator can send an EAP request/identity frame to the endpoint to request its identity. Upon receipt of the frame, the client's supplicant can respond with an EAP response/identity frame. The supplicant can also trigger the authenticator to request an identity by sending an EAPoL Start message.

Figure 7:
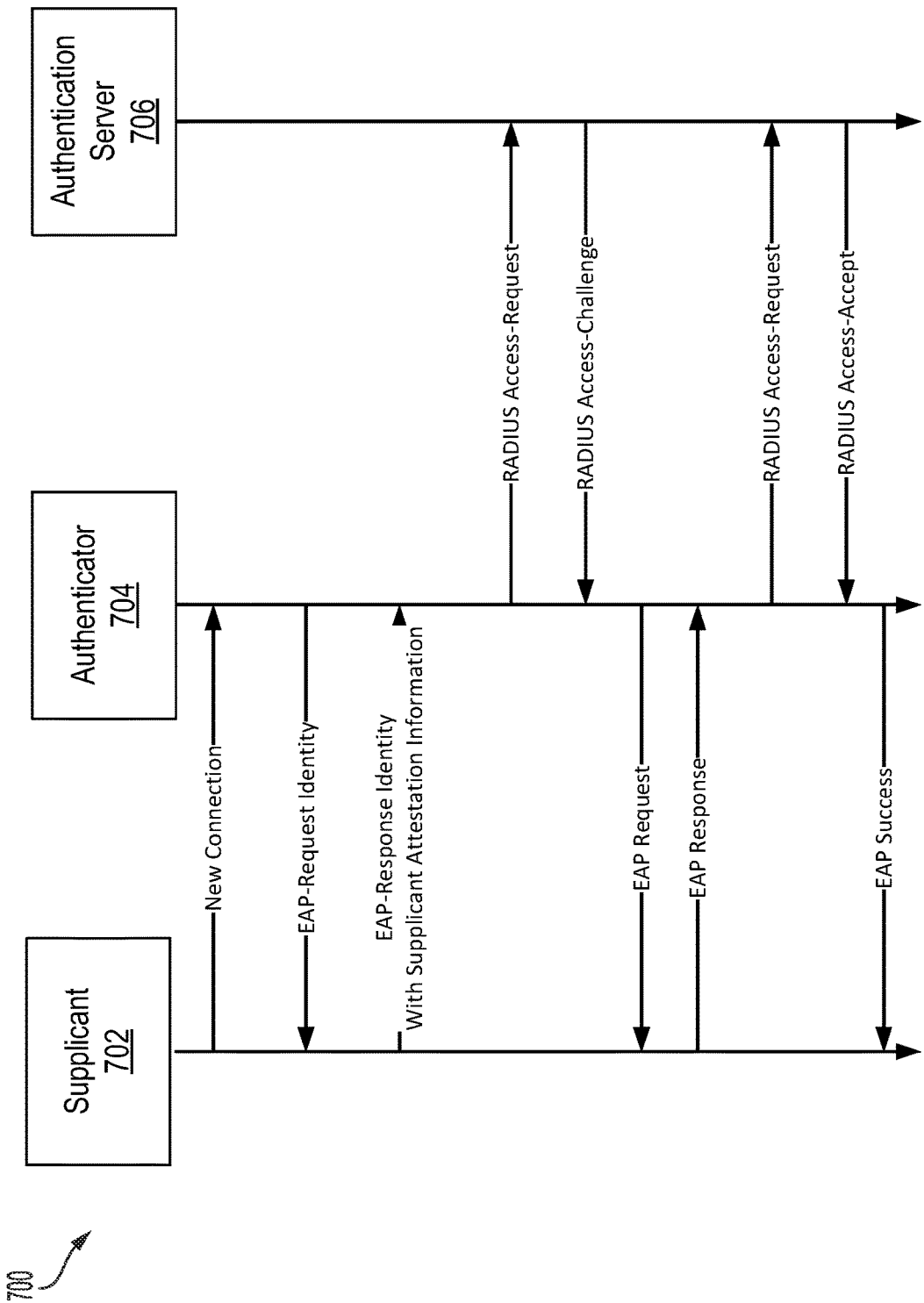
FIG. 7, shows a network timing diagram for verifying the trustworthiness of a supplicant using attestation information supplied from the supplicant to an authenticator according to a unidirectional link layer communication scheme implementing 802.1x for authenticating the supplicant.

In sending the attestation information through a unidirectional push of information according to a unidirectional link layer communication scheme implementing 802.1x, the attester node 602 can be the supplicant and the relying node 604 can be authenticator. FIG. 7, shows a network timing diagram 700 for verifying the trustworthiness of a supplicant 702 using attestation information supplied from the supplicant 702 to an authenticator 704 according to a unidirectional link layer communication scheme implementing 802.1x for authenticating the supplicant 702. Specifically, the authenticator 704, acting as the relying node 604, can receive the attestation information from the supplicant 702, acting as the attester node 602, according to the example network environment 600 shown in FIG. 6.

In the example timing diagram 700, the supplicant 702 can attempt to establish a connection with the authenticator 704. The authenticator 704 can then send an EAP-Request Identity message to the supplicant 702. In turn, the supplicant 702 can respond with an EAP-Response Identity message including attestation information of the supplicant 702. Specifically, the supplicant 702 can send an EAP-Response Identity message including attestation information of the supplicant 702 as part of a unidirectional push of information according to a unidirectional link layer communication scheme that implements 802.1x.

The authenticator 704 can then verify the trustworthiness of the supplicant 702 using the attestation information included in the EAP-Response Identity message. If the supplicant 702 is verified as untrustworthy, then the authenticator 704 can stop the authentication process of the supplicant 702, e.g. terminate the connection and refrain from sending a RADIUS Access-Request message to an authentication server 706. Alternatively, if the supplicant 702 is verified as trustworthy, then the authenticator 704 can continue with the authentication process and send the RADIUS Access-Request message to the authentication server 706.

In response, the authentication server 706 can send a RADIUS Access-Challenge message to the authenticator 704. The Access-Challenge message can include an EAP request that indicates a specific EAP method to use in authenticating the supplicant 702. The authenticator 704 can then encapsulate the EAP Request received from the authentication server 706 in an EAPOL frame that is transmitted to the supplicant 702. The supplicant 702 can then start using the specific EAP method or request an alternative EAP method, e.g. through a Negative Acknowledgement and respond with the EAP Methods it is willing to perform. A similar message exchange can continue until an EAP method is agreed upon.

Once the authentication server 706 and the supplicant 702 agree on an EAP Method, then EAP Requests and Responses are sent through the authenticator 704 between the supplicant 702 and the authentication server 706 until the authentication server 706 responds with either an EAP-Success message, or an EAP-Failure message. If authentication is successful, the authenticator 704 sets the port to an authorized state and normal traffic is allowed. Conversely, if authentication fails, then the port remains in an unauthorized state.

Further, in sending the attestation information through a unidirectional push of information according to a unidirectional link layer communication scheme implementing 802.1x, the attester node 602 can be the authenticator and the relying node 604 can be the supplicant. FIG. 8, shows a network timing diagram 800 for verifying trustworthiness of an authenticator 804 using attestation information transmitted from the authenticator 804 to a supplicant 802 according to a unidirectional link layer communication scheme implementing 802.1x for authenticating the supplicant 802. Specifically, the supplicant 802, acting as the relying node 604, can receive the attestation information from the authenticator 804, acting as the attester node 602, according to the example network environment 600 shown in FIG. 6.

In the example timing diagram 800, the supplicant 802 can attempt to establish a connection with the authenticator 804. The authenticator 804 can then send an EAP-Request Identity message to the supplicant 802 including attestation information of the authenticator 804. Specifically, the authenticator 804 can send an EAP-Request Identity message including attestation information of the authenticator 804 as part of a unidirectional push of information according to a unidirectional link layer communication scheme that implements 802.1x.

The supplicant 802 can then verify the trustworthiness of the authenticator 804 using the attestation information included in the EAP-Request Identity message. If the authenticator 704 is verified as untrustworthy, the supplicant 802 can stop the authentication process, e.g. terminate the connection and refrain from sending an EAP-Response Identity message to the authenticator 804. Alternatively, if the authenticator 804 is verified as trustworthy, then the supplicant 802 can continue with the authentication process and send the EAP-Response identity message to the authenticator 804. In turn, the supplicant 802 can then be authenticated according to the previously described technique with respect to FIG. 7. Specifically, the authenticator 804 can send a RADIUS Access-Request to the authentication server 806, and the authentication process can continue as previously described with respect to FIG. 7.

Additionally, in sending the attestation information through a unidirectional push of information according to a unidirectional link layer communication scheme implementing 802.1x, the authenticator can function as both the attester node 602 and the relying node 604. Further, the supplicant can function as both the attester node 602 and the relying node 604. FIG. 9, shows a network timing diagram 900 for mutually verifying the trustworthiness of a supplicant 902 and an authenticator 904 using attestation information transmitted according to a unidirectional link layer communication scheme implementing 802.1x for authenticating the supplicant 902. Specifically, the supplicant 902, acting as the relying node 604, can receive the attestation information from the authenticator 904, acting as the attester node 602, according to the example network environment 600 shown in FIG. 6. Further, the authenticator 904, acting as the relying node 604, can receive the attestation information from the supplicant 902, acting as the attester node 602, according to the example network environment 600 shown in FIG. 6.

In the example timing diagram 900, the supplicant 902 can attempt to establish a connection with the authenticator 904. The authenticator 804 can then send an EAP-Request Identity message to the supplicant 902 including attestation information of the authenticator 904. Specifically, the authenticator 904 can send an EAP-Request Identity message including attestation information of the authenticator 904 as part of a unidirectional push of information according to a unidirectional link layer communication scheme that implements 802.1x.

The supplicant 902 can then verify the trustworthiness of the authenticator 904 using the attestation information included in the EAP-Request Identity message. If the authenticator 904 is verified as untrustworthy, then the supplicant 902 can stop the authentication process, e.g. terminate the connection and refrain from sending an EAP-Response identity message to the authenticator 904. Alternatively, if the authenticator 904 is verified as trustworthy, then the supplicant 902 can continue with the authentication process. Specifically, the supplicant 902 can assume the role of the attester node 602 and send an EAP-Response identity message to the authenticator 804, assuming the role as the relying node 604, that includes attestation information of the supplicant 902.

The authenticator 904 can then verify the trustworthiness of the supplicant 902 using the attestation information included in the EAP-Response Identity message. If the supplicant 902 is verified as untrustworthy, then the authenticator 904 can stop the authentication process of the supplicant 902, e.g. terminate the connection and refrain from sending a RADIUS Access-Request message to an authentication server 906. Alternatively, if the supplicant 902 is verified as trustworthy, then the authenticator 904 can continue with the authentication process and send the RADIUS Access-Request message to the authentication server 906. The authentication process can then continue as previously described with respect to FIG. 7.

While the timing diagrams 700, 800, and 900 are discussed with respect to a unidirectional link layer communication scheme implementing 802.1x, the techniques discussed with respect to the timing diagrams 700, 800, and 900 can be applied through an applicable unidirectional link layer authentication scheme.

Returning back to the network environment 600 shown in FIG. 6, the attestation information sent from the attester node 602 to the relying node 604 as part of a unidirectional push of attestation information can included nested attestation information. Specifically, the attester node 602 can receive a challenge from the relying node 604. The challenge can be used to verify the integrity of attestation information received from the attester node 602. For example, the challenge can request that the attester node 602 include old verified information, e.g. old verified attestation information, in the attestation information that is sent to the relying node 604. In turn, the attester node 602 can generate nested attestation information that includes information that is the subject of the challenge, e.g. old attestation information. As follows, the attester node 602 can send the nested attestation information to the relying node 604, where the nested attestation information can be used in verifying the trustworthiness of the attester node 602.

When the attester node 602 and the relying node 604 are communicating through a unidirectional link layer communication scheme that implements a link layer unidirectional device discovery protocol then the attester node 602 can provide the attestation information as part of communications exchanged according to the unidirectional device discovery protocol. Specifically, the attester node 602 can provide the attestation information as part of a unidirectional push through a device advertising message sent by the attester node 602 according to a unidirectional device discovery protocol. For example, if the attester node 602 is advertising itself through LLDP, then the attester node 602 can provide the attestation information to the relying node 604 as part of one or more TLV records in one or more LLDP advertisement messages sent to the relying node 604.

The relying node 604 can function to operate with the verifier 606 to verify the trustworthiness of the attester node 602 based on the attestation information received from the attester node 602. For example, the verifier 606 can verify the trustworthiness, at least in part, of the attester node 602 by verifying the attestation information received at the relying node 604. In another example, the verifier 606 and the relying node 604 can have synchronized clocks and the verifier 606 can verify the attestation information or measurements used to generate the attestation information before the attestation information is sent from the attester node 602 to the relying node 604. As follows, if the clock of the verifier 606, e.g. as indicated through the attestation information, is synchronized with the clock of the relying node 604, then the relying node 604 can verify the attestation information and ultimately the trustworthiness of the attester node 602.

The disclosure now turns to FIGS. 10 and 11, which illustrate example network nodes and computing devices, such as switches, routers, client devices, endpoints, servers, and so forth.

FIG. 10 illustrates an example network device 1000 suitable for performing switching, routing, and other networking operations. Network device 1000 includes a central processing unit (CPU) 1004, interfaces 1002, and a connection 1010 (e.g., a PCI bus). When acting under the control of appropriate software or firmware, the CPU 1004 is responsible for executing packet management, error detection, and/or routing functions. The CPU 1004 can accomplish these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1004 to efficiently perform routing computations, network diagnostics, security functions, etc.

Although the system shown in FIG. 10 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC) 1012, which can be configured to perform routing and/or switching operations. The ASIC 1012 can communicate with other components in the network device 1000 via the connection 1010, to exchange data and signals and coordinate various types of operations by the network device 1000, such as routing, switching, and/or data storage operations, for example.

FIG. 11 illustrates a computing system architecture 1100 including various components in electrical communication with each other using a connection 1106, such as a bus. Example system architecture 1100 includes a processing unit (CPU or processor) 1104 and a system connection 1106 that couples various system components including the system memory 1120, such as read only memory (ROM) 1118 and random access memory (RAM) 1116, to the processor 1104. The system architecture 1100 can include a cache 1102 of high-speed memory connected directly with, in close proximity to, or integrated as part of the processor 1104. The system architecture 1100 can copy data from the memory 1120 and/or the storage device 1108 to the cache 1102 for quick access by the processor 1104. In this way, the cache can provide a performance boost that avoids processor 1104 delays while waiting for data. These and other modules can control or be configured to control the processor 1104 to perform various actions.

Other system memory 1120 may be available for use as well. The memory 1120 can include multiple different types of memory with different performance characteristics. The processor 1104 can include any general purpose processor and a hardware or software service, such as service 1 1110, service 2 1112, and service 3 1114 stored in storage device 1108, configured to control the processor 1104 as well as a special-purpose processor where software instructions are incorporated into the actual processor design. The processor 1104 may be a completely self-contained computing system, containing multiple cores or processors, a bus, memory controller, cache, etc. A multi-core processor may be symmetric or asymmetric.

To enable user interaction with the computing system architecture 1100, an input device 1122 can represent any number of input mechanisms, such as a microphone for speech, a touch-sensitive screen for gesture or graphical input, keyboard, mouse, motion input, speech and so forth. An output device 1124 can also be one or more of a number of output mechanisms known to those of skill in the art. In some instances, multimodal systems can enable a user to provide multiple types of input to communicate with the computing system architecture 1100. The communications interface 1126 can generally govern and manage the user input and system output. There is no restriction on operating on any particular hardware arrangement and therefore the basic features here may easily be substituted for improved hardware or firmware arrangements as they are developed.

Storage device 1108 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1116, read only memory (ROM) 1118, and hybrids thereof.

The storage device 1108 can include services 1110, 1112, 1114 for controlling the processor 1104. Other hardware or software modules are contemplated. The storage device 1108 can be connected to the system connection 1106. In one aspect, a hardware module that performs a particular function can include the software component stored in a computer-readable medium in connection with the necessary hardware components, such as the processor 1104, connection 1106, output device 1124, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
    receiving, by a relying node in a network environment, attestation information from an attester node in the network environment as part of a unidirectional push of information from the attester node according to a unidirectional link layer communication scheme;
    verifying a trustworthiness of the attester node by identifying a level of trust of the attester node from the attestation information, wherein:
        the attestation information includes a signed result that includes a single nonce and the signed result is generated by passing the single nonce through a crypto-processor; and
        the single nonce is formed by combing random numbers of a set of random numbers; and
    controlling network service access of the attester node through the relying node in the network environment based on the level of trust of the attester node identified from the attestation information.

2. The method of claim 1, wherein the unidirectional link layer communication scheme implements 802.1x unidirectional discovery and authentication.

3. The method of claim 2, wherein the relying node is an authenticator and the attester node is a supplicant.

4. The method of claim 3, wherein the authenticator receives the attestation information of the supplicant as part of an Extensible Authentication Protocol (EAP)-Response Identity message for initiating authentication of the supplicant according to the unidirectional link layer communication scheme.

5. The method of claim 2, wherein the relying node is a supplicant and the attester node is an authenticator.

6. The method of claim 5, wherein the supplicant receives the attestation information from the authenticator as part of an EAP-Request Identity message for initiating authentication of the supplicant according to the unidirectional link layer communication scheme.

7. The method of claim 6, wherein the supplicant is configured to provide supplicant attestation information to the authenticator as part of an EAP-Response Identity message for verifying the trustworthiness of the supplicant according to the unidirectional link layer communication scheme based on whether the authenticator is verified as trustworthy from the attestation information received from the authenticator.

8. The method of claim 7, wherein the supplicant is configured to refrain from responding with the supplicant attestation information included as part of the EAP-Response Identity message if the authenticator is verified as untrustworthy from the attestation information received from the authenticator.

9. The method of claim 7, wherein the supplicant is configured to respond with the supplicant attestation information included as part of the EAP-Response Identity message if the authenticator is verified as trustworthy from the attestation information received from the authenticator.

10. The method of claim 2, wherein the attestation information is nested attestation information generated by the attester node in response to a challenge received at the attester node from the relying node and the nested attestation information is received from the attester node as part of the unidirectional push of information from the attester node according to the unidirectional link layer communication scheme.

11. The method of claim 1, wherein the unidirectional link layer communication scheme implements one or more link layer unidirectional discovery protocols.

12. The method of claim 11, wherein the link layer unidirectional discovery protocols include at least one of Link Layer Discovery Protocol (LLDP), Cisco Discovery Protocol (CDP), Foundry Discovery Protocol (FDP), Nortel Discovery Protocol (NDP), and Link Layer Topology Discovery (LLTD).

13. The method of claim 11, wherein the attestation information is included as part of one or more type-length-value (TLV) records in one or more messages received from the attester node.

14. The method of claim 1, wherein the attestation information is generated based on verification by a verifier and clock synchronization between the verifier and the relying node.

15. The method of claim 1, further comprising:
    receiving, by the attester node, responses from a set of relying nodes in the network environment, wherein each response includes an unpredictable and random number from the perspective of the attester node to form the set of random numbers;
    transmitting the signed result as part of the attestation information to the relying party for determining, at least in part, a freshness level of the signed result.

16. A system comprising:
    one or more hardware processors; and
    at least one computer-readable storage medium having stored therein instructions which, when executed by the one or more processors, cause the one or more processors to perform operations comprising:
        receiving, by a relying node in a network environment, attestation information from an attester node in the network environment as part of a unidirectional push of information from the attester node according to a unidirectional link layer communication scheme that implements either 802.1x unidirectional discovery and authentication or one or more link layer unidirectional discovery protocols;
        verifying a trustworthiness of the attester node by identifying a level of trust of the attester node from the attestation information, wherein:
            the attestation information includes a signed result that includes a single nonce and the signed result is generated by passing the single nonce through a crypto-processor; and
            the single nonce is formed by combing random numbers of a set of random numbers; and
        controlling network service access of the attester node through the relying node in the network environment based on the level of trust of the attester node identified from the attestation information.

17. The system of claim 16, wherein the unidirectional link layer communication scheme implements 802.1x unidirectional discovery and authentication and the relying node is an authenticator and the attester node is a supplicant, further wherein the authenticator receives the attestation information of the supplicant as part of an Extensible Authentication Protocol (EAP)-Response Identity message for initiating authentication of the supplicant according to the unidirectional link layer communication scheme.

18. The system of claim 16, wherein the unidirectional link layer communication scheme implements 802.1x unidirectional discovery and authentication and the relying node is a supplicant and the attester node is an authenticator, further wherein the supplicant receives the attestation information from the authenticator as part of an EAP-Request Identity message for initiating authentication of the supplicant according to the unidirectional link layer communication scheme.

19. The system of claim 16, wherein the unidirectional link layer communication scheme implements one or more link layer unidirectional discovery protocols.

20. A non-transitory computer-readable storage medium having stored therein instructions which, when executed by one or more processors, cause the one or more processors to perform operations comprising:

receiving, by a relying node in a network environment, attestation information from an attester node in the network environment as part of a unidirectional push of information from the attester node according to a unidirectional link layer communication scheme that implements either or both unidirectional device discovery and unidirectional authentication;

verifying a trustworthiness of the attester node by identifying a level of trust of the attester node from the attestation information, wherein:

the attestation information includes a signed result that includes a single nonce and the signed result is generated by passing the single nonce through a crypto-processor; and the single nonce is formed by combing random numbers of a set of random numbers; and controlling network service access of the attester node through the relying node in the network environment based on the level of trust of the attester node identified from the attestation information.

\* \* \* \* \*